United States Patent
Johnson

[15] 3,671,500
[45] June 20, 1972

[54] LACTAM POLYMERIZATION WITH N,N'-DIALKYL-AZETIDINEDIONE INITIATORS

[72] Inventor: Herbert E. Johnson, South Charleston, W. Va.

[73] Assignee: Union Carbide Corporation, New York, N.Y.

[22] Filed: July 9, 1970

[21] Appl. No.: 53,684

[52] U.S. Cl. .......................................... 260/78 L, 260/78 P
[51] Int. Cl. ................................ C08g 20/12, C08g 20/18
[58] Field of Search .......................................... 260/78 L, 78 P

[56] References Cited
UNITED STATES PATENTS

| | | | |
|---|---|---|---|
| 3,028,369 | 4/1962 | Butler et al. | 260/78 L |
| 3,185,677 | 5/1965 | Davis | 260/78 P |
| 3,403,135 | 9/1968 | Schmitt et al. | 260/78 L |

Primary Examiner—William H. Short
Assistant Examiner—L. M. Phynes
Attorney—Paul A. Rose, Aldo John Cozzi, Gerald R. O'Brien, Jr. and James J. O'Connell

[57] ABSTRACT

An N,N'-dialkyl-azetidinedione compound is used as an initiator or activator with alkaline catalyst in the anionic polymerization of lactam monomer so as to provide for a rapid polymerization process.

15 Claims, No Drawings

LACTAM POLYMERIZATION WITH N,N'-DIALKYL-AZETIDINEDIONE INITIATORS

BACKGROUND OF THE INVENTION

1. Field of the Invention

The invention relates to the anionic polymerization of lactam monomer.

2. Description of the Prior Art

In the anionic polymerization of lactams there is usually employed a catalyst/initiator system. The catalyst is commonly a material which will form an alkali or alkaline earth metal salt of the lactam.

Although there are a number of materials known to those in the art as initiators for such reactions, many of such initiators are not commercially useful because they either do not provide polymerization rates which are fast enough in the various types of molding equipment and processes which are used commercially and which require relatively fast processing conditions, or the products produced with such initiators do not have commercially acceptable physical properties.

SUMMARY OF THE INVENTION

Lactams are anionically polymerized utilizing a catalyst-initiator system whereby the lactam may be readily polymerized in a relatively short period of time to produce commercially acceptable polymers. The polymerization system contains an anionic catalyst and, as the initiator or activator, one or more N,N'-dialkyl-azetidinedione compounds.

An object of the present invention is to provide an anionic polymerization process whereby lactams may be readily polymerized in a relatively short period of time to provide high molecular weight nylon polymers.

Another object of the present invention is to provide a novel initiator or activator system for use in the anionic polymerization of lactam monomers.

DESCRIPTION OF THE PREFERRED EMBODIMENT

It has now been found that lactams may be polymerized anionically so as to provide the objects of the present invention if there is employed as the catalyst/initiator system for such polymerization an anionic catalyst and, as an initiator or activator, one or more N,N'-dialkyl-azetidinedione compounds.

THE LACTAMS

The lactams which may be polymerized according to the present invention are all those which are capable of being polymerized anionically and are preferably those lactam monomers which contain at least one ring group of the structure

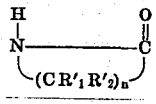

wherein $n$ is a whole number which is 3 to 15, and preferably 3 to 10, and $R'_1$ and $R'_2$ may be the same or different radicals on each carbon atoms and may be H or $C_1$ or $C_{10}$ hydrocarbon.

Such lactams would include those having a single ring structure such as 2-pyrrolidone, 2-piperidone, 6-methyl-2-piperidone, ε-caprolactam, enantholactam, capryllactam, lauryllactam, decanolactam, undecanolactam, dodecanolactam, pentadecanolactam, hexadecanolactam, alkyl substituted caprolactams, aryl substituted lactams, and the like.

Lactams having a plurality or ring structures which may be used in the present invention include bis-lactams such as alkylene bis lactams of the formula:

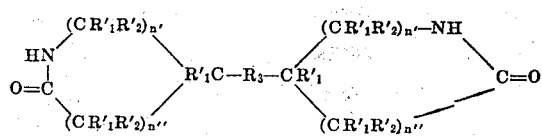

wherein $n'$ and $n''$ are each whole numbers such that $n'$ and $n''$ is 2 to 14; $R'_1$ and $R'_2$ are as defined above; and $R_3$ may be $C_1$ to $C_4$ alkylene such as methylene, ethylene, propylene and butylene; phenylene and substituted phenylene; O and S.

Other lactams having a plurality of ring structures include bicyclic lactams, such as those represented by the formulas

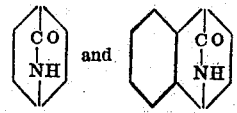

The lactams to be polymerized can be used individually or in any combination thereof.

THE INITIATOR

The initiator which is to be employed in the process of the present invention is a compound having the structure

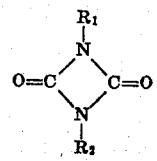

wherein $R_1$ and $R_2$ are the same or different monovalent, $C_1$ to $C_{20}$, and preferably $C_1$ to $C_{10}$, aliphatic radicals. The aliphatic radicals may be linear, branched or cyclic. They may be saturated or unsaturated. The preferred of such radicals are methyl, ethyl, propyl, isopropyl, n-butyl, t-butyl, n-pentyl, n-decyl and 2-methyl-hexyl-1.

The aliphatic radicals may also be substituted with substituents which would be inert to the azetidinedione compounds themselves or to the reactants used in forming such azetidinedione compounds, or to the other components of the anionic polymerization system of the present invention. Thus, the aliphatic radicals may be substituted with $C_1$ to $C_4$ alkoxy, halogen, cyano, $C_1$ to $C_4$ acetoxy and tertiary amino groups. The aliphatic radicals may not be substituted with active hydrogen containing groups such as primary and secondary amino, mercapto, oximido (hydroxyimino) carboxy and hydroxy (alcoholic and phenolic) groups.

These initiator compounds may be generally characterized as N,N'-dialkyl-azetidinediones.

Some of the initiator compounds, i.e. where $R_1=R_2$, may be prepared in low yields as disclosed in British Pat. No. 1,153,815 or French Pat. No. 1,532,054. All of the initiator compounds may be prepared by first reacting a compound of the formula

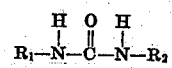

wherein $R_1$ and $R_2$ are as described above, with a compound of the formula $COX_2$, wherein X is a halogen radical, i.e., Cl, F, Br, or I, to produce a compound (II) of the formula

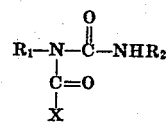

and HX as a by-product.

Such reaction may be conducted at temperatures of about 0° to 150° C., at atmospheric pressure, and in an acid accepting solvent such as pyridine. The reaction is generally disclosed in U.S. Pat. No. 3,337,621 and by H.Ulrich et al. in Journal of Organic Chemistry, 29, 2401-4(1964).

In the second step of the process compound (II) is heated at atmospheric pressure at temperatures of 0° to 150° C in the presence of a tertiary amine such as a trialkylamine, such as trimethylamine. Other acid acceptors could also be used. This reaction may also be conducted at higher temperatures in the absence of such acid acceptors. The reaction may be conducted in an inert organic solvent such as chloroform, benzene and toluene. Under such conditions compound (II) cyclizes to form the initiator compound (I) and, as by-products, compounds of the formula $(alkyl)_3N$ and HX.

Examples of the initiators which may be used in the process of the present invention are N,N'-dimethyl-azetidinedione, N-methyl, N'-ethyl-azetidinedione, N-methyl-N'-n-propyl-azetidinedione, N-methyl,N'-isopropyl-azetidinedione, N-methyl,N'-n-butyl-azetidinedione, N-methyl-N'-t-butyl-azetidinedione, N,N'-diethyl-azetidinedione, N,N'-di-n-propyl-azetidinedione and N,N'di-n-butyl-azetidinedione.

The initiators of the present invention may be used individually or in combination with one another or with one or more initiators. About 0.1 to 10 moles of initiator are employed per 100 moles of lactam monomer being polymerized.

THE POLYMERS

The use of the initiators of the present invention results in the preparation of polymers by the following reactions:

$$\text{(I)} + \text{(IV)} \xrightarrow{\text{Step 1}} \text{(V)}$$

$$\text{(V)} + \text{HN} \xrightarrow{\text{Step 2}} R_1NHCONCON + M^\oplus N^\ominus$$
$$\text{(VI)} \quad \text{(VII)} \quad \text{(IV)}$$

In Step 2 the catalytic species (VI) is regenerated.

$$\text{(VII)} + nN H \xrightarrow{\text{Step 3}} \text{(VI)} \quad \text{(IV)}$$

$$R_1NHCON{-}CO[NH(CH_2)_5CO]_nN \quad \text{(VIII)}$$

The intermediate (VII) may also undergo another reaction:

$$\text{(VII)} + M^\oplus N^\ominus \longrightarrow \quad \text{(IV)}$$

$$R_1NHCON + R_2\bar{N}{-}CON$$
$$\text{(IX)} \quad M^+ \quad \text{(X)}$$

then:

$$\text{(X)} + HN \longrightarrow R_2NHCON + \text{(IV)}$$
$$\text{(VI)} \quad \text{(XI)}$$

Thus, the catalyst is again regenerated.

$$\text{(IX)} \quad R_1NHCO[NH(CH_2)_5CO]_nN \text{ and/or } + nHN \xrightarrow{\text{(IV)}}$$
$$\text{(XII)} \quad \text{(VI)}$$

and/or $$\text{(XI)} \quad R_2NHCO[NH(CH_2)_5CO]_nN$$
$$\text{(XIII)}$$

Therefore, the final nylon product may be (VIII), (XII), or (XIII), or a mixture of these.

The reaction scheme shown above is for the case where ε-caprolactam is the lactam being polymerized. With other lactams, the reaction schemes are similar. Thus a generalized reaction for all lactams may be shown by replacing the moiety $(CH_2)_5$ in the structures shown above with the moiety R' wherein R' would represent that portion of the structure of the lactam being polymerized which lies between the nitrogen atom and the carbonyl carbon atom of such lactam. In such reaction scheme, also;

$R_1$ and $R_2$ are as defined above,

M is the cation of the anionic catalyst and $n$ is a whole number which is >1 and is such that the polymers produced in the resulting polymeric system are normally solid, i.e., solid at temperatures of about 25° C., and have reduced viscosities in m-cresol (0.1 grams/100 ml) at 25° of ≥ 0.4, and preferably about 0.8 to 7, deciliters/gram.

The value of n may vary somewhat in each polymerized lactam chain, and will be about 10 to about 5,000. The polymers would thus have molecular weights of about 1,000 to 500,000 or more.

The lactam polymers prepared with the N,N'-dialkyl-azetidinedione initiators of the present invention have good physical properties.

THE CATALYST

The catalysts which may be employed in the anionic polymerization reaction of the present invention include all anionic catalyst materials which may be employed in the anionic polymerization of lactams. The catalyst material is usually a salt of the lactam being polymerized although any other lactam may be used to form the catalyst. The salt is usually prepared by reacting the lactam with a strong base, i.e., a base strong enough to convert the lactam to its salt. Such bases would include alkali and alkaline earth metals or basic derivatives of such metals such as the hydroxides, oxides, alkoxides, phenoxides, hydrides, alkyls, aryls, amides, borohydrides and weak acid salts, i.e., acetates, carbonates, bicarbonates, benzoates, sulfites and bisulfites; Grignard reagents, and various other organo-metallic compounds. Such bases would include, therefore, metals such as lithium, sodium, potassium, magnesium, calcium, strontium, barium, and aluminum and derivatives of such metals, such as lithium hydroxide, sodium hydroxide, potassium hydroxide, magnesium hydroxide, calcium hydroxide, strontium hydroxide, barium hydroxide, lithium hydride, sodium hydride, sodium oxide, sodium methoxide, sodium phenoxide, sodium methyl, sodium ethyl, sodium phenyl, sodium naphthyl, and sodamide; Grignard reagents such as ethyl magnesium chloride, methyl magnesium bromide, and phenyl magnesium bromide; and other compounds such as zinc diethyl, triisopropyl aluminum, diiosbutyl aluminum hydride, and lithium aluminum hydride.

About 0.2 to 20, and preferably 0.5 to 6 mole percent of catalyst is used per mole of monomer being polymerized.

The catalyst and initiator are employed in a mole ratio to each other of about 2 to 20, and preferably, 3 to 12.

When the strong base is reacted with the lactam to form the catalyst a by-product is usually formed. For example, hydrogen is formed as a by-product when the metal hydrides or the elemental metals are used; water is formed as a by-product when metal hydroxides are used; alcohols are formed when alkoxides are used and water and $CO_2$ are formed when carbonate or bicarbonate salts are used. The preferred catalysts are those which result in the most readily removable by-products, since some of the by-products, such as $H_2O$, may have a deleterious effect on the polymerization reaction.

THE POLYMERIZATION PROCESS

The polymerization reaction is preferably conducted in bulk. Under such bulk polymerization procedures the monomer, catalyst and initiator are charged in the desired proportions to the reactor. The bulk polymerization reaction is usually conducted at atmospheric pressure and at a temperature of about 100° to 250° C. The reaction can be conducted at a temperature which is above or below the melting point of the resulting polymer, and above that of the monomer. The use of elevated pressure is not required for the polymerization reaction. The bulk polymerization reaction requires a polymerization period of about 0.1 to 10 minutes at 100°–250° C, depending on the lactam(s) employed, and the polymerization temperature. The bulk polymerization reaction should be carried out under anhydrous conditions, i.e., in the presence of no more than about 0.3 weight percent, and preferably no more than 0.03 weight percent, of water or other active hydrogen containing by-product. Where a catalyst is used which would generate water or other active hydrogen containing by-products, such as the hydroxide, alkoxide or phenoxide catalysts, the excess amounts of such by-product materials should be removed before the polymerization reaction is conducted.

The polymerization is preferably carried out under an inert blanket of gas, such as, nitrogen, argon or helium in order to prevent oxidative degradation of the monomer and destruction of the catalyst by moisture.

The reaction may be carried out batchwise or continuously. An advantageous method of carrying out the reaction of the present invention is to conduct the bulk polymerization in conventional molding equipment such as a rotational casting, device or a compression molding machine, or an extruder. In this way the polymer and the molded objects can both be formed in one step. Where the polymerization is conducted in such molding devices, conventional molding pressures may be employed in order to simultaneously form the molded object with the in situ formed polymer.

Since the lactams are normally solid materials at room temperatures, the bulk polymerization reactions may be carried out by various procedures. In one procedure, the lactam may be melted, and both the catalyst and the initiator admixed with it and then the reaction may be caused to proceed by bringing the reaction mixture to polymerization temperatures.

In another procedure, the catalyst and initiator may be dissolved separately in the lactam monomer, after which the two separate solutions may be combined to cause the polymerization to proceed at polymerization temperatures. Where the polymerization is conducted in molding equipment, the equipment may be heated to the desired polymerization temperature in order to effect polymerization upon injection therein of the polymerization reaction system.

In addition to conducted in bulk, the polymerization may also be conducted in high boiling inert organic solvents, i.e., those having boiling points of above 100° C., such as chlorobenzene, dichlorobenzene, xylene, trichlorobenzene, dimethyl sulfoxide, N-alkyl pyrrolidones and hexamethylphosphoramide at temperatures of about 100° C. up to the boiling point of the solvent; or at temperatures of about 130 to 240° C. in dispersion systems such as those disclosed in U.S. Pat. Nos. 3,061,592 and 3,383,352, by G.B. Gechele and G.F. Martins in J. Applied Polymer Science 9, 2939 (1965).

ADJUVANTS

The polymerization reaction of the present invention may also be conducted in the presence of various types of adjuvant materials which are normally employed with the types of polymers prepared by the present invention, or the adjuvants may be added to the polymer after it is formed. Such adjuvant materials would include fillers, stabilizers, fibrous reinforcing agents such as asbestos and glass fiber, and pigmenting materials.

The particular polymer being prepared as well as the end use application will dictate the selection and quantity of the adjuvant to be employed therewith since it is the respective adjuvants for such polymers and such applications that are to be employed in the present invention. The adjuvants employed must be physically and chemically compatible with each of the other components of the monomer and polymer based compositions, under the prescribed operating conditions. As such, where they are present during the polymerization reaction, the adjuvants should not contain reactive groups which would interfere with the polymerization reactions, such as active hydrogen containing groups such as carboxyl, amino, mercaptan or hydroxyl groups.

The adjuvants would be used in amounts which would be effective for intended purpose. Thus, a stabilizer would be used in a stabilizingly effective quantity, and the fillers would be used in effective quantities therefor. For example, if a reinforcing filler were to be used, such filler should be used in such amounts as to provide the desired reinforcing effect.

The polymers made by the process of the present invention may be used for a number of applications which require the use of molded articles prepared from lactam polymers such as fibers, films, engineering structures, coatings and hollow articles such as tubing and solvent tanks.

The following examples are merely illustrative of the present invention and are not intended as a limitation upon the scope thereof.

General procedure for the polymerization of $\epsilon$-Caprolactam in the examples:

Into each of two 25 × 200 mm test tubes was added 28.3 g. (0.25 mole) of dry ( $\leq$ 0.03 percent $H_2O$) molten caprolactam and both were then heated at the desired polymerization temperature. Sodium hydride in the form of a dispersion (57 percent) in mineral oil was added to one of these test tubes, while the initiator was added to the other. After solutions were formed in the two test tubes and equilibrated with the bath temperature, they were mixed, and a thermocouple was inserted in the resulting mixture. The progress of the polymerization was followed both visually and by observing the reaction temperature which, due to the exotherm of the polymerization, rises initially. Thus, the rate with which the reaction reaches peak temperature is an indication of the polymerization rate. The time required for the development of opacity was taken as an indication of the time required for crystallization of the Nylon 6 formed.

EXAMPLE 1

The polymerization of $\epsilon$-caprolactam promoted by unsymmetrical N,N'-dialkyl-azetidinedione compounds was compared with the polymerization of $\epsilon$-caprolactam with N,N'-diphenyl-azetidinedione and toluene diisocyanate (TDI) as initiators at 150° C., and at NaH and initiator concentrations of 2 and 0.5 mole percent, respectively. Data relative to these polymerization reactions, and the resulting polymers, are summarized in Table I below. This data clearly indicates that the polymerization reactions promoted by the N,N'-dialkyl-azetidinedione compounds are more rapid than either of the reactions promoted by the dimer of phenyl isocyanate or TDI. The color of the polymers was a good off-white color. The reported reduced viscosity and percent $H_2O$ extraction values were obtained on polymer produced after the noted 5 minute heat cycle times.

Table I—Comparison of Initiator Efficiency:

| Initiator | time for no flow, seconds | time for crystal, seconds | total heat cycle time at 150°,min. | % $H_2O$* Extractables | R.V. |
|---|---|---|---|---|---|
| N-methyl-N'-ethyl azetidinedione | 21 | 61 | 5 | 4.3 | 1.98 |
| N-methyl-N'-t-butyl azetidinedione | 18 | 20 | 5 | 3.3 | 1.58 |
| N,N'-diphenyl azetidinedione | 30 | 47 | 5 | 3.7 | 1.56 |
| TDI | 24 | 32 | 5 | 3.7 | gel |

*24 hour extraction in boiling $H_2O$ in a soxlet extractor.

EXAMPLES 2 THROUGH 8

Variation of the $R_1$ and $R_2$ groups of the dialkyl azetidinedione initiators of the present invention and such effect on the polymerization of ε-caprolactam is summarized in Table II.

The color of the polymers thus produced was a good off-white color.

The reduced viscosity and percent $H_2O$ insoluble values were obtained on the polymers produced after the noted 5 minute heating cycle.

TABLE II.—EFFECT OF THE ALKYL GROUP ON DI-ALKYL-AZETIDINEDIONE INITIATED POLYMERIZATION OF ε-CAPROLACTAM
[A five-minute heating cycle was employed in the polymerization reactions]

| Example | R | R' | Mole percent | | Temp., °C. | Crystal time, sec. | R.V.* | Percent $H_2O$ ** insoluble |
|---|---|---|---|---|---|---|---|---|
| | | | Initiator | Catalyst | | | | |
| 2 | CH₃ | C₂H₅ | 1 | 2 | 170 | 10 | 1.27 | 93.4 |
| 3 | CH₃ | C₂H₅ | 1 | 2 | 140 | 30 | 1.03 | 96.5 |
| 4 | CH₃ | t-C₄H₉ | 1 | 2 | 140 | 8 | 0.92 | |
| 5 | CH₃ | n-C₃H₇ | 1 | 2 | 140 | 25 | | |
| 6 | CH₃ | i-C₃H₇ | 1 | 2 | 140 | 13 | | |
| 7 | n-C₄H₉ | n-C₄H₉ | 1 | 2 | 140 | 17 | | |
| 8 | CH₃ | CH₃ | 0.9 | 2 | 140 | 80 | 1.19 | 96.5 |

\* 0.1 gr./100 ml. in m-cresol at 25° C.
\*\* 24 hours boiling water soxlet extraction.

What is claimed is:

1. A process for anionically polymerizing a lactam monomer to a moldable polymer a with an anionic lactam polymerization catalyst and an anionic lactam polymerization initiator which comprises using as said initiator at least one N,N'-dialkyl-azetidinedione compound.

2. A process as in claim 1 wherein said N,N'-dialkyl-azetidinedione compound has the structure:

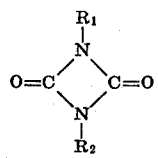

wherein $R_1$ and $R_2$ are the same or different $C_1$ to $C_{20}$ alkyl radicals.

3. A process as in claim 2 wherein said lactam monomer comprises ε-caprolactam.

4. A process as in claim 3 wherein $R_1$ and $R_2$ are the same.

5. A process as in claim 4 wherein $R_1$ and $R_2$ are methyl radicals.

6. A process as in claim 4 wherein $R_1$ and $R_2$ are butyl radicals.

7. A process as in claim 6 wherein $R_1$ and $R_2$ are n-butyl radicals.

8. A process as in claim 3 in which $R_1$ and $R_2$ are different.

9. A process as in claim 8 in which $R_1$ is methyl.

10. A process as in claim 9 in which $R_2$ is ethyl.

11. A process as in claim 9 in which $R_2$ is n-propyl.

12. A process as in claim 9 in which $R_2$ is isopropyl.

13. A process as in claim 9 in which $R_2$ is a butyl radical.

14. A process as in claim 13 in which $R_2$ is n-butyl.

15. A process as in claim 13 in which $R_2$ is t-butyl.

UNITED STATES PATENT OFFICE
CERTIFICATE OF CORRECTION

Patent No. 3,671,500          Dated June 20, 1972

Inventor(s) Herbert E. Johnson

It is certified that error appears in the above-identified patent and that said Letters Patent are hereby corrected as shown below:

Column 1, line 60, "atoms" should read --atom--.

Column 3, lines 66 through 76, the sequence of reactions should read (IX)

and/or + nHN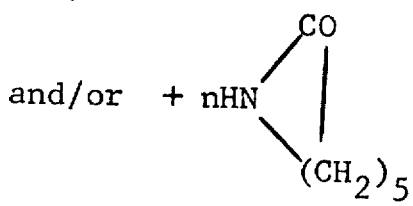

(VI)

$\xrightarrow{(IV)}$ (XII) $R_1NHCO[\overline{NH}(CH_2)_5C\underline{O}]_nN$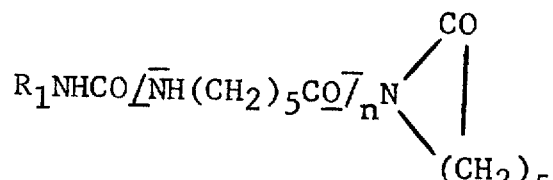

and/or (XIII) $R_2NHCO[\overline{NH}(CH_2)_5C\underline{O}]_nN$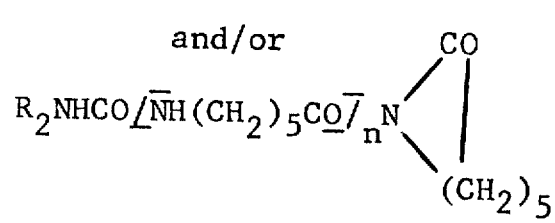

(XI)

Column 5, line 50, --being-- should be inserted after "to".

Column 5, line 58, --and-- should be inserted before "by".

Signed and sealed this 5th day of December 1972.

(SEAL)
Attest:

EDWARD M. FLETCHER, JR.
Attesting Officer

ROBERT GOTTSCHALK
Commissioner of Patents